July 19, 1966 R. V. MATHISON 3,261,069
FASTENERS AND ARTICLES EMPLOYING SAME
Filed June 4, 1963 2 Sheets-Sheet 2
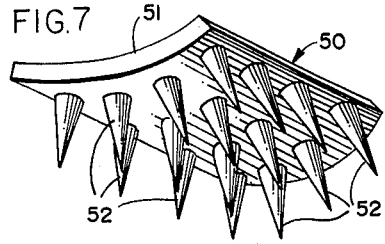
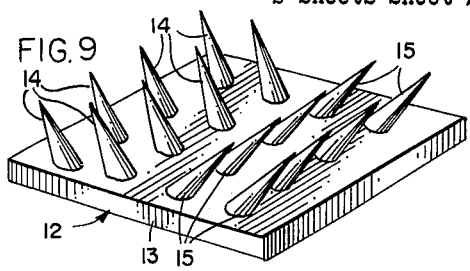
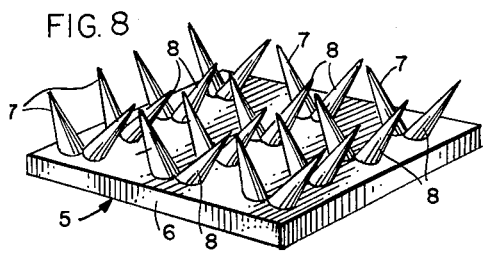
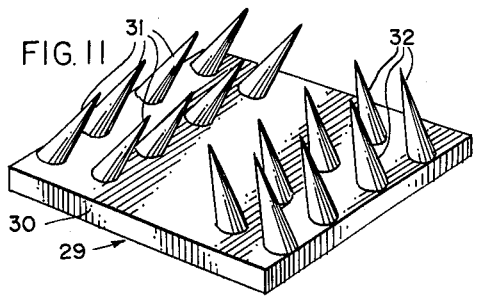
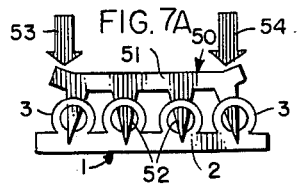
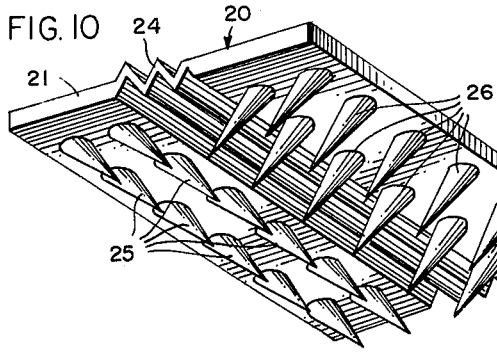
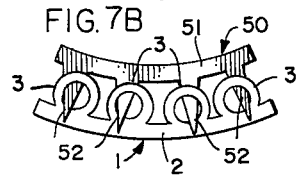
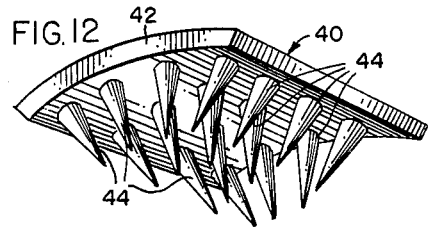
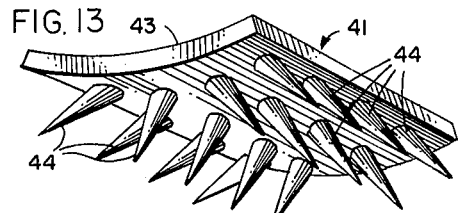
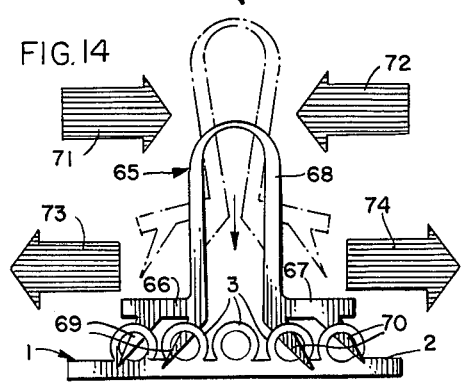
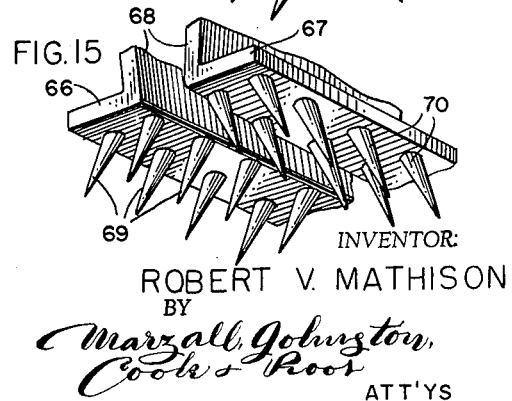
INVENTOR:
ROBERT V. MATHISON
BY
Marzall, Johnston,
Cook & Root
ATT'YS

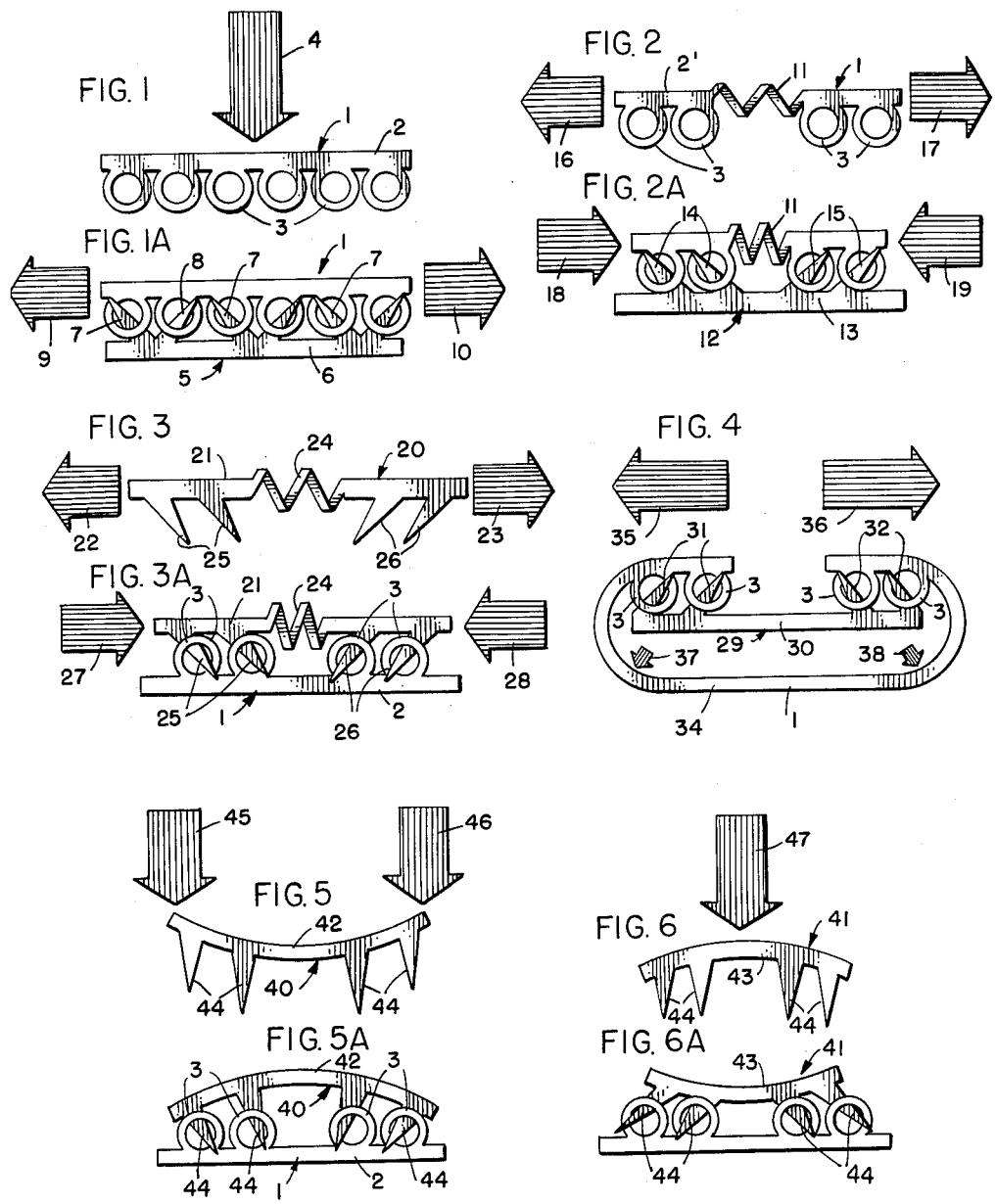

United States Patent Office 3,261,069
Patented July 19, 1966

3,261,069
FASTENERS AND ARTICLES EMPLOYING SAME
Robert V. Mathison, 5 Woodcrest Road, Asheville, N.C.
Filed June 4, 1963, Ser. No. 285,261
7 Claims. (Cl. 24—204)

This invention, in general, relates to fasteners, to articles containing said fasteners, and to methods of manufacture of said fasteners.

Briefly, the fasteners of this invention have a plurality of tapered projections which grip a fabric or other easily penetrable surface and thereby attach the fabric via the fastener to the member on which the fastener is mounted. It is further possible to secure two fasteners of the invention together in back to back relationship and attach fabric or other material to both sides of the resultant fastener to provide a two-ply assembly, e.g., a fabric and a liner therefor.

The projections of the fasteners of the invention, at least in the fabric-gripping position, slope in different directions, in many instances in opposite directions. They may be arranged so as to be sloping in substantially opposite directions to the component directions of two-directional tension forces in the corresponding fabric portions atttached to the fasteners. In some cases, the fasteners are so constructed so that the portions of the fasteners carrying the projections can be set or sprung to a different position to either (a) change the angular relationship of the projections relative to the plane of the fabric after the projections are inserted therein to give the bi-directional sloping projections or (b) change the longitudinal relationship of the projections in the plane of the fabric, e.g., by using a fastener wherein the base member on which the projections are supported is elastic or resilient and can be stretched (or contracted) prior to inserting the projections in the fabric, after which the member is released from tension (or compression) and the resilient recovery of the member drives the sloping projections further into the fabric. Still other aspects of the fasteners are discussed hereinafter in the description of several preferred embodiments of the invention illustrated in the drawings wherein:

FIGURE 1 is a schematic view of a piece of loop pile fabric in end elevation;

FIGURE 1A is a schematic view in end elevation of a piece of said loop pile fabric gripped on a fastener embodiment of the invention;

FIGURE 2 is a schematic view in end elevation of a piece of elastic, lop pile fabric;

FIGURE 2A is a schematic view in end elevation of the fabric of FIGURE 2 gripped on another fastener embodiment;

FIGURE 3 is a schematic view in end elevation of an elastic fastener of the invention;

FIGURE 3A is a schematic view in end elevation of the fastener of FIGURE 3 gripping a piece of loop pile fabric;

FIGURE 4 is a schematic view in end elevation of a loop of loop pile fabric gripped on another fastener embodiment of the invention;

FIGURE 5 is a schematic view in end elevation of still another fastener embodiment;

FIGURE 5A is a schematic view in end elevation of the fastener of FIG. 5 gripping a piece of loop pile fabric;

FIGURE 6 is a schematic view in end elevation of another fastener embodiment;

FIGURE 6A is a schematic view in end elevation of the fastener of FIG. 6 gripping a piece of loop pile fabric;

FIGURE 7 is a perspective view of still another fastener embodiment;

FIGURE 7A is a schematic view in end elevation of the fastener of FIG. 7 as it is pressed and inserted in a piece of loop pile fabric;

FIGURE 7B is a schematic view in end elevation of the fastener of FIG. 7 in gripping relation with the fabric after release of pressure thereon;

FIGS. 8, 9, 10, 11, 12, and 13, respectively are perspective views showing the projection-containing face of the fastener embodiments illustrated in FIGS. 1, 2, 3, 4, 5a and 6a; and FIGS. 14 and 15 are, respectively, a schematic view in end elevation with a piece of loop pile fabric gripped by still another fastener embodiment of the invention, and said fastener embodiment in fragmentary, perspective view.

Referring to FIGURE 1, a piece of loop pile fabric 1 comprising a base portion 2 and a loop pile 3 is pressed in the direction of the arrow against the face of the fastener 5 on which the projections appear. The fastener 5 comprises a base or support member 6 having a plurality of sloping projections extending outwardly therefrom. In this embodiment, there is a group of sloping, tapered projections 7 sloping in one direction and another group of sloping, tapered projections 8 interspersed among the projections 7, e.g., alternating therewith, and sloping in a direction opposite (in the illustrated case, diametrically opposite) to the direction of slope of the projections 7. Instead of projections sloping in two opposite directions only, the fastener may have projections sloping in three, four or more different directions. The loop pile fabric, or knitted, woven, or other textile form, is pressed against the fastener face with projections 7, 8 and worked thereagainst to snare the openings of the fabric, e.g., the loops 3, over a large number of the projections. The fastener, attached to another structure (not shown), holds the fabric against pull forces in the directions of the arrows 9, 10, which directions are substantially opposite the slope directions of projections 7, 8, respectively.

In the embodiment of FIGS. 2 and 2A, the loop pile fabric 1' has a base 2' which is elastically stretchable in the plane of the base 2'. The elasticity of the base is shown schematically by the convoluted section 11. The elastic fabric 1' in the stretched state (FIG. 2) is pressed against the face of the fastener 12 comprising in this case the base or support strip 13 having on said face a group or rows of projections 14 sloping outwardly away from the longitudinal center of the strip and another group or rows of projections 15 sloping outwardly away from said longitudinal center in the opposite direction. When the stretching tension in the fabric section placed across fastener 12 (schematically illustrated by arrows 16, 17) is released, the elastic property of the fabric draws the loop piles 3 inwardly toward the longitudinal center (schematically illustrated by arrows 18, 19). Many fabrics have inherent stretch elasticity, as a result of their weave, knit, or other mode of fabrication and/or type of filament or yarn employed, to stretch elastically in amounts sufficient for purposes of the invention.

In the embodiment of FIGS. 3 and 3A, the fastener support or base is elastically stretchable instead of the fabric. The fastener 20 comprises an elastic base strip 21 which is transversely stretchable under tension forces in the direction of arrows 22, 23. The elastic stretchability of base 21 is shown schematically by convoluted section 24. There is on one side of a face of the base 21 a plurality in groups or rows of tapered projections 25 which slope toward the longitudinal center line of base 21 and on the other side of the face of the base a plurality in groups or rows of tapered projections 26 which slope oppositely to projections 25 and also toward the center line of base 21.

The projections 25, 26 of fastener 20 are pressed against fabric 1 while the strip is stretched (FIG. 1), and the stretching tension is released. The base 21 contracts and drives the projections 25, 26 deeper into the pile loops or other openings in other types of fabrics. The fastener grip on the fabric resists side thrusts on the fastener in the direction of arrows 27, 28 by the opposition of sloping projections 26, 25, respectively.

The fastener 29 of FIG. 4 comprises a rigid base or support strip 30 having on each edge thereof a group or rows of sloping projections 31 and 32, each group sloping toward the longitudinal center of the strip 30. This fastener holds a loop 34 of fabric, e.g., loop pile fabric 1 with pile loops 3, the projections 31 and 32 resisting pull forces in the direction of arrows 35, 36, respectively, when pull forces are exerted on the loop, e.g., forces represented by arrows 37, 38.

The fasteners 40 and 41 of FIGS. 5 and 6 are molded or otherwise manufactured with the transversely arched, convexo-concave base or support strip 42 (FIG. 5) or a transversely arched, concavo-convex base or support strip 43 (FIG. 6). Both bases or strips have a plurality of substantially parallel projections 44. When the projections 44 are pressed into the fabric 1, the transverse arch of strips 40, 41 is inverted in each case, by applying force along opposite edges of fastener 40 as shown by arrows 45, 46 or by applying force along the center line of fastener 41 as shown by arrow 47. The projections 44 may become longer in a direction outwardly from the longitudinal center line of fastener 41 (FIGS. 6 and 6A) or shorter for fastener 40 (FIGS. 5 and 5A) to keep their tips in a common plane when the fasteners are inverted. The inversion of the transverse arch of strips 42 and 43 causes the projections to turn inwardly (FIG. 5A) and outwardly (FIG. 6A) to lock the projections in the pile loops 3 or other openings in the fabric.

The fastener 50 of FIG. 7 comprises a strip or support member 51 which is transversely convexo-concave. The tapered projections 52 thereon extend in a direction wherein the longitudinal center lines of the projections are substantially normal to the tangents of the convex face of the strip 51 through the center lines of each projection. In order to make the projections 52 substantially parallel for insertion into the fabric, the strip 51 is flattened by exerting forces represented by arrows 53, 54 along its opposite longitudinal edges. With the strip 51 substantially flattened (FIG. 7A), the center lines of projections 52 become substantially parallel and the projections extend substantially unidirectionally. They easily penetrate the pile loops 3 (or other opening in other types of fabric). Upon releasing the pressure on the longitudinal edges, the strip 51 returns elastically to its original transverse arch, and the projections 52 swing outwardly to securely engage the pile loops 3 or other fabric openings.

The fastener of FIGS. 14 and 15 comprises a strip 65 comprising a pair of spaced ribs 66, 67 connected by a strip 68 of U-shape in end view. The U-shaped strip 68 is resilient so that the contiguous ends of ribs 66, 67 can be brought close together, the position in phantom. The groups or rows of outwardly sloping, tapered projections 69, 70 are pressed into the loops 3 or other fabric interstices with the fastener in compressed position (the phantom position) by applying pressure against strip 68 as shown by arrows 71, 72. When the pressure is released, U-shaped strip springs outwardly to shift projections 69, 70 in the direction of arrows 73, 74 and seat them securely in the loops 3 or other fabric interstices.

The foregoing embodiments exemplify the broad variety of uses of the fasteners of the invention. It is to be understood that the tapered projections in the aforesaid groups or rows occur at relatively great frequency with relatively close spacings, as hereafter described.

In the preferred forms thereof, the projections are molded on the fastener wall structures in the form of a synthetic polymer as a plurality of smooth sided, substantially rigid, closely spaced projections integrally formed of said polymer on at least one side of said supporting structure and tapering from their bases to relatively sharp tips. The said projections preferably extend outwardly from said supporting structure at an angle of 30 to 80°. In groupings such as projections 14, 15, 25, 26, 31, 32, 69 and 70, the projections of each group are preferably closely spaced in parallel rows in which they all extend in the same direction and the rows are close enough together so that the tips of projections in one row extend above the sides, or partially overlap the projections in an adjacent row. In other words, if a vertical line were drawn from the tip of one projection it would intersect the side of an adjacent projection. The projections are preferably conical or pyramidal and are spaced from one another at their bases a distance of 0.03 to 0.10 inch. They also preferably have a center-to-center spacing at their tips from 0.03 to 0.25 inch. The size of the bases of the projections is preferably at least 0.03 inch in one dimension. The vertical height of the tips of the projections from the supporting structure is preferably within the range of 0.03 to 0.150 inch. The number of projections is preferably within the range of 200 to 500 per square inch.

As a typical example, the projections can be 0.050 inch in length and slanted at an angle of 45° with the supporting structure. The bases of these projections can be 0.030 inch in diameter and taper to a tip having a diameter of 0.010 inch. The supporting structure can be 0.014 inch in thickness at places where there are no projections and the over-all thickness from the tips of the projections through the supporting structure can be 0.064 inch. There can be a projection tip every 0.050 inch or about 400 points per square inch.

As another example, the thickness of the supporting structure can be $\frac{1}{32}$ inch. The projections can be slanted at an angle of 55°. The projections are disposed in rows in two directions, the rows being $\frac{1}{16}$ inch apart and the projections being $\frac{1}{16}$ inch apart center-to-center in each row. The vertical height from the tips of the projections to the top of the supporting structure can be $\frac{1}{16}$ inch. Considering each projection as a cone, the base can be $\frac{1}{32}$ inch. The projections can overlap each other to the extent that a vertical line drawn from the tip of one projection will substantially intersect the mid-point of the base of the preceding projection. Thus, a fastener of this type containing eight projections in each row longitudinally and seven rows laterally will occupy a space of approximately ½ inch on each side allowing some room for margins.

The size and arrangement of the projections will vary to some extent depending upon the intended use but in most cases it is preferable that the projections be integrally formed or molded on a supporting sheet at an angle of 45 to 60°, that the adjacent projections be separated from each other center-to-center by a distance of from 0.060 to 0.150 inch, and that the vertical height from the tips of the projections to the surface of the supporting sheet be from 0.060 to 0.150 inch.

The synthetic polymer from which the fastener is formed can be a homo-polymer, such as a polymer of formaldehyde (e.g., Delrin), or a polymer of tetrafluoroethylene (e.g., Teflon), or polyethylene or polypropylene, or a copolymer (e.g., nylon). These polymers can also be described as synthetic resins.

The projections 6, 7 (FIGS. 1 and 1A), 44 (FIGS. 5 and 6), and 52 (FIGS. 7–7B) may have substantially the same dimensions and spacings as aforedefined. They do not, however, extend in the same direction as adjacent projections inasmuch as they slope in different directions or are parallel. Furthermore, the overlying relationship between the tips with the bases of adjacent tapered projections obviously does not apply to the particular illustrated arrangement in FIG. 1 or FIG. 7. The tips may, however, overlie the bases of adjacent bases in the fastening positions shown in FIGS. 5 and 6.

Methods of manufacture

The fasteners of the invention are most economically produced from thermoplastic polymers by molding technique. Injection molding and compression molding are the best molding processes for this purpose. The fasteners of the invention can be produced in rapid sequence by injection molding with a flowable polymer mass or with powdered polymer or powder preforms, respectively, in machines for these molding techniques. The dies are female dies from which the molded unit is ejected.

Ejection cannot be done successfully wherein the female dies have the recesses sloping at different angles in the dies. Therefore, the dies for moldings such as fasteners 12 (FIG. 2A), 20 (FIGS. 3 and 3A), 29 (FIG. 4), 50 (FIGS. 7–7B) and 65 (FIGS. 14 and 15) cannot be molded in the reverse form (female) of these fasteners. Fasteners such as these are molded in dies having the holes for forming the projections all parallel, e.g., parallel to the direction in which the mold is ejected form the die.

Taking the fastener 12 of FIG. 2A, the fastener would be molded in a die forming the base 13 transversely arched or bent (at the mid-point) to form, in a direction away from the face on which the projections appear, the transverse bend or slope of the base portion allowing the projections 14 and 15 to be molded parallel to each other. The general configuration in end elevation of the molded product is similar to the view of fastener 41 in FIG. 6.

The molded product is further processed by heating it sufficiently to make base 13 plastic enough, without affecting the projections, so that it can be straightened to the flat shape shown in FIG. 2A and then cooled. The projections 14, 15 in the process, will become sloped divergently outwardly when the strip sets upon cooling.

The molded base 21 of fastener 20 will be bowed or arched in the opposite direction, whereby the molded product appears in end elevation similar to the fastener 40 in FIG. 5, in the molding of fastener 20, the remaining steps being the same. The same is true for making fastener 30 (FIG. 4).

The fastener of FIG. 7 would be molded in the shape shown in FIG. 7A, after which the strip 51 is heated sufficiently so that it can be arched to the shape shown in FIG. 7.

The strip for the fastener 65 of FIGS. 14 and 15 is molded with the wall formed by ribs 66, 67 and connecting strip 68 is bowed or bent in a direction away from the projections 69, 70, i.e., in the orientation for molding fastener 12 (FIG. 2). The molded unit is reshaped to that of FIGS. 14 and 15 by heating the strip portion 68 and rib portions 66, 67 to the degree required, reshaping the heated member, and setting by cooling.

The strips for the fastener embodiments of FIGS. 5 and 6 are molded in the form shown in these figures inasmuch as the projections 44 are substantially parallel. The base walls 42, 43 may be sufficiently thin so that they will snap into the position shown in FIGS. 5A and 6A by the application of pressure as heretofore described. If the fastener strips of FIGS. 5 and 6 are made of materials which do not have characteristics permitting the inversion of the arch of the bases 42, 43 in the manner shown whereby the inverted arch will be retained after release of the pressure causing the inversion, the base strips 42, 43 can be heated sufficiently in the case of thermoplastic polymers when the arch of the strips is inverted as shown in FIGS. 5A and 6A to render the strips plastic. Thereafter, the strips can be cooled while retaining the pressure causing the inversion of the arch so that the strip upon cooling will set in the inverted arch shown in FIGS. 5A and 6A.

The important factor in molding any of the aforedescribed strips is to orient the position of the portions of the base member or base strip upon which the projections are located so that all of the projections extend substantially in the same direction, i.e., with the central axes of the respective projections being substantially parallel. The base member or strip can then be easily ejected from the mold, after which the base member or strip is reshaped in order to attain a fastener strip or element in which the projections extend in at least two different directions.

The fastener strip of FIG. 1A with oppositely-directed projections 7 and 8 in adjacent rows also can be molded by injection or compression molding. The strip is molded with the base strip 2 shaped, as viewed in end elevation, as a symmetrical, multi-curved strip having alternating hills and valleys. The pairs of projections 7, 8 are positioned in parallel relationship on opposite sides of the centers or low points of each valley, and extend upwardly in a direction substantially normal to the tangents of the curve segments at said centers or low points of said valleys. When the molded strip is later reshaped by heating the multi-curved strip to a plastic state and flattening the curved base strip to the form shown in FIG. 1A, the projections 7, 8 assume the oppositely slanting directions shown in FIG. 1A.

It will be recognized that the invention herein described may take many forms, and modifications other than the specific embodiments herein described can be made within the spirit and scope of the generic invention. It will be understood, also, that the fasteners herein described as separate pieces, to be attached to a part on which the fabric or the like is to be secured, may be molded as an integral component of said part, if desired.

The invention is hereby claimed as follows:

1. A fastener structure adapted to be removably fastened on a material with penetrable surface openings and comprising a molded synthetic polymer article embodying a molded base with groups of closely spaced, integrally molded, small projections emanating from a face thereof, said projections of each group being arranged in rows, said projections being smooth-sided and tapering from the bases thereof to relatively pointed outer ends, the longitudinal axes of said projections of each respective group being straight lines extending at right angles to said rows of the respective group and obliquely to said face at an acute angle with respect to said face, said projections having a height from their respective tips to their bases in the range of 0.030 inch to 0.150 inch, the projections of one of said groups sloping relative to said face in the same general direction and forming respective units of sloping, closely spaced, penetrating members adapted to penetrate a plurality of closely spaced surface openings of a material of the character aforedescribed, the projections of another of said groups sloping relative to said face in another general direction essentially opposite to said first-mentioned general direction and forming another unit of sloping, closely spaced, penetrating members adapted to penetrate other closely spaced surface openings of said material, the shortest side of the respective projections of said respective groups also defining from the respective base to the respective tip thereof of a straight line sloping in the same general direction as said longitudinal axes of the respective projections of each respective group and at an acute angle relative to said face, whereby material of the aforesaid character penetrated by said projections may be firmly seated on said projections and thereby firmly, but releasably, gripped on said fastener structure.

2. A fastener structure adapted to be removably fastened on a material with penetrable surface openings and comprising a molded synthetic polymer article embodying a molded base with groups of closely spaced, integrally molded, small projections emanating from a face thereof, said projections of each respective group being arranged in parallel rows extending both transversely and longitudinally on said face, said projections being smooth-sided and tapering from the bases thereof to relatively pointed outer ends, the longitudinal axes of said projections of each respective group being straight lines extending at right angles to the respective transverse rows and obliquely to said face at an acute angle with respect to said face, said transverse rows of said projections of each respective group being spaced sufficiently close so that the tips of said projections in one row overlie the bases of the projections in the next adjacent row of the respective group, said projections of each respective group having a height from the respective tips to the base in the range of 0.030 inch to 0.150 inch, the projections of one of said groups sloping relative to said face in the same general direction and forming a unit of sloping, closely spaced, penetrating members adapted to penetrate a plurality of closely spaced surface openings of a material of the character aforedescribed, the projections of another of said groups sloping relative to said face in another general direction essentially opposite to said first-mentioned general direction and forming another unit of sloping, closely spaced, penetrating members adapted to penetrate other closely spaced surface openings of said material, the shortest side of the respective projections of said respective groups also defining from the respective base to the respective tip thereof a straight line sloping in the same general direction as said longitudinal axes of the respective projections of each respective group and at an acute angle relative to said face, whereby material of the aforesaid character may be penetrated by said projections firmly seated on said projections and thereby firmly, but releasably, gripped on said fastener structure.

3. A fastener structure as claimed in claim 1 wherein said groups are two groups wherein the rows of projections of both groups are essentially parallel with each other, and the longitudinal axes of the projections of one group diverge with respect to the longitudinal axes of the projections of the other group in a direction outwardly from said face.

4. A fastener structure as claimed in claim 1 wherein said groups are two groups wherein the rows of projections of both groups are essentially parallel with each other, and the longitudinal axes of the projections of one group converge with respect to the longitudinal axes of the projections of the other group in a direction outwardly from said face.

5. A fastener structure as claimed in claim 4 wherein said molded base is an elastically deformable synthetic polymer adapted to be elastically deformed before embedding said projections in said material to provide an elastic recovery for seating said projections of the respective groups in said material.

6. A fastener structure as claimed in claim 2 wherein said molded base is an elastically deformable synthetic polymer adapted to be elastically deformed before embedding said projections in said material to provide an elastic recovery for seating said projections of the respective groups in said material.

7. A fastener structure adapted to be removably fastened on a material with penetrable surface openings and comprising a molded synthetic polymer article embodying a molded base with groups of closely spaced, integrally molded, small projections emanating from a face thereof, said projections of each respective group being arranged in parallel rows extending both transversely and longitudinally on said face, said projections being smooth-sided and tapering from the bases thereof to relatively pointed outer ends, the longitudinal axes of said projections of each respective group being straight lines extending at right angles to the respective transverse rows and obliquely to said face at an acute angle with respect to said face, said transverse rows of said projections of each respective group being spaced sufficiently close so that the tips of said projections in one row overlie the bases of the projections in the next adjacent row of the respective group, said projections of each respective group having a height from the respective tips to the base in the range of 0.030 inch to 0.150 inch, the projections of one of said groups sloping relative to said face in the same general direction and forming a unit of sloping, closely spaced, penetrating members adapted to penetrate a plurality of closely spaced surface openings of a material of the character aforedescribed, the projections of another of said groups sloping relative to said face in another general direction essentially opposite to said first-mentioned general direction and forming another unit of sloping, closely spaced, penetrating members adapted to penetrate other closely spaced surface openings of said material, the shortest side of the respective projections of said respective groups also defining from the respective base to the respective tip thereof a straight line sloping in the same general direction as said longitudinal axes of the respective projections of each respective group and at an acute angle relative to said face, whereby the rows of projections of each group being essentially parallel, the longitudinal axes of the projections of one group converging with respect to the longitudinal axes of the projections of the other group in a direction outwardly from said face, and said molded base being an elastically stretchable synthetic polymer adapted to be stretched elastically in a direction wherein said groups are further separated before embedding said projections in said material and thereby providing an elastic recovery drawing said groups closer together for seating said projections in said material.

References Cited by the Examiner

UNITED STATES PATENTS

| | | | |
|---|---|---|---|
| 1,921,999 | 8/1933 | Dickinson | 24—87 |
| 1,933,391 | 10/1933 | Reeves. | |
| 2,035,674 | 3/1936 | Sipe | 24—204 |
| 2,041,262 | 5/1936 | Ness. | |
| 2,262,881 | 11/1941 | Boenecke | 18—59 |
| 2,302,912 | 11/1942 | Poux | 18—59 |
| 2,308,336 | 1/1943 | Mason | 24—87 |
| 2,461,083 | 2/1949 | Rank | 24—258 |
| 2,542,077 | 2/1951 | Gershen | 24—150 |
| 2,587,292 | 2/1952 | DeVoe | 24—87 |
| 2,673,169 | 3/1954 | Finch | 24—87 |
| 2,690,107 | 9/1954 | Ludwig | 24—150 |
| 3,020,613 | 2/1962 | Morin. | |
| 3,031,730 | 5/1962 | Morin. | |
| 3,106,761 | 10/1963 | Mohring | 45—24 |
| 3,124,894 | 3/1964 | Via | 45—24 |
| 3,134,152 | 5/1964 | Pei | 24—203 |

FOREIGN PATENTS 285,165   2/1928   Great Britain.

WILLIAM FELDMAN, *Primary Examiner.*

DONLEY J. STOCKING, *Examiner.*

B. A. GELAK, *Assistant Examiner.*